United States Patent [19]

Gillies

[11] Patent Number: 4,897,535

[45] Date of Patent: Jan. 30, 1990

[54] RANDOM NUMBER GAME RESULT CHECKING AID

[76] Inventor: Ross E. Gillies, 6 Flinders Street, Matraville, NSW, Australia, 2036

[21] Appl. No.: 278,646

[22] Filed: Dec. 2, 1988

[51] Int. Cl.[4] ............................................. G06K 21/06
[52] U.S. Cl. ..................................... 235/495; 235/494
[58] Field of Search ................................. 235/495, 494

[56] References Cited

U.S. PATENT DOCUMENTS 4,149,670  4/1979  Axelrod .......................... 235/495 X

FOREIGN PATENT DOCUMENTS 0104969  4/1984  European Pat. Off. .

Primary Examiner—Harold I. Pitts
Attorney, Agent, or Firm—Townsend and Townsend

[57] ABSTRACT

A coupon checker with grid pattern. Plural openings receive the coupon for alignment.

7 Claims, 1 Drawing Sheet

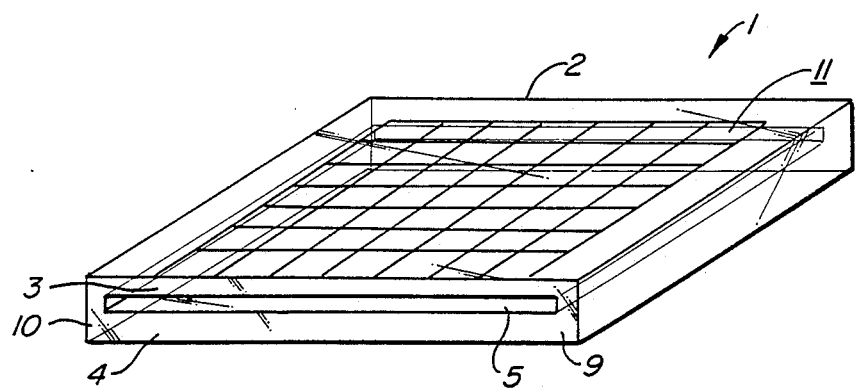
FIG._1.
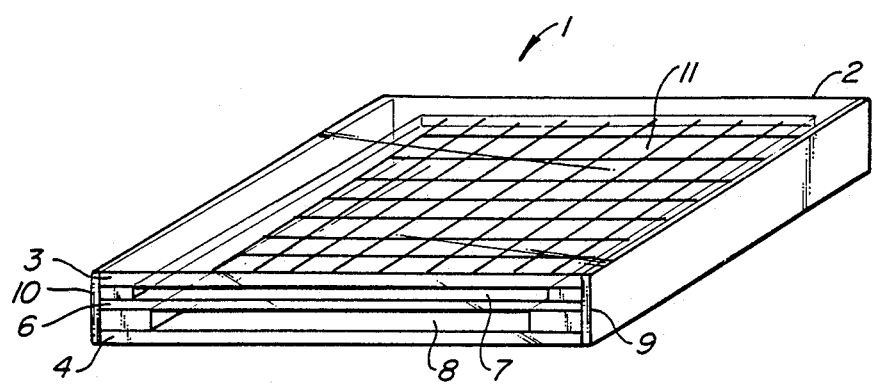
FIG._2.

RANDOM NUMBER GAME RESULT CHECKING AID

The present invention relates to games and in particular relates to an aid for identifying and checking randomly selected numbers which fall in a random pattern from a predetermined set pattern of numbers and from a predetermined range on a game coupon.

BACKGROUND OF THE INVENTION

There are in existence a number of gambling games which involve the random selection of numbers from a set range of numbers. The more notable of these games are Lotto and the Soccer Pools. Both of these games require the player to randomly select from a laid out grid pattern of numbers, six or eight numbers according to the manner in which the player has elected to play the game. Each game essentially is presented on a preprinted form displaying a grid pattern which comprises an array of boxes. Each of the said boxes contain a number. The boxes are filled in sequential order from numbers usually within the range of 1 to 40.

In order to play either game a player must mark (usually with an 'X') each of the boxes to be selected. Once the selection has been made on the grid a random pattern of numbers will be formed. Of all of the possible permutations and combinations of selected numbers only one pattern or combination of numbers can win. The winning combination is that which corresponds to the set of winning numbers which are either randomly selected by a random selection machine or which are determined according to the results of soccer games in the case of the Soccer Pools.

The authorities who control each game have the task of checking the hundreds of thousands of entries which are submitted and this is done by microfilming the entry coupons of each player then electronically checking the coupons to determine the winners.

The individual player generally checks his or her coupons by merely checking off the numbers as they come to hand.

To assist in this process, the present invention provides a number checking aid to enable checking of the coupons.

There are in existence a number of aids which are available for the express purpose of spotting numbers from a grid pattern however such devices primarily involve overlying of the device over the game coupon thereby enabling magnification of the number through a magnification window. One difficulty which can be experienced with these devices is in the proper alignment of the device with the numbers. Accurate alignment is essential for proper and accurate checking and as this is a manual task it can involve alignment error.

SUMMARY OF THE INVENTION

The present invention whilst ameliorating problems which have existed in prior art devices also provides a random number checking aid which enables self alignment between the aid and the coupon. In the prior art devices when checking, the device itself must be moved relative to the coupon being checked, whereas in the present invention the coupon is moved relative to the checking aid.

Another prior art coupon checking device involves the use of a clamp which holds the coupon against a supporting wall. The disadvantage of this device which is disclosed in European Patent Specification. No. 0104969 in the name of Ross Gillies, is that jambing and consequently crumpling of the coupon occurs. This problem is eliminated in the present invention.

In its broadest form the present invention comprises a self aligning random number pattern visual checking aid for use with a game coupon said aid comprising:
 a substantially planar base member and;
 at least a second substantially planar member overlying the said planar base member but being spaced apart from said base member, to leave at least one opening between said base member and said overlying member or members, means interconnecting said planar members at or near their ends so as to form sidewalls of said opening which act as aligning guides for a coupon inserted within said opening said opening having a constant cross section from one of said ends to the other of said ends, said overlying planar member having means to enable provision of erasable markings on the outer surface of said overlying member, wherein,
 when a marked coupon is to be checked, the coupon is manually fed into said opening between said planar members until a grid pattern on said coupon aligns with grid markings on said outer surface.

In the preferred embodiment the invention comprises plastic perspex or glass planar members either moulded together or glued via the sidewalls. The opening is proportioned to accommodate at least one size of game coupon.

BRIEF DESCRIPTION OF THE DRAWINGS

The invention will now be described in more detail according to a preferred but non-limiting embodiment and with reference to the accompanying illustrations wherein:

FIG. 1 shows an isometric view of the and according to a preferred embodiment.

FIG. 2 shows an alternative embodiment of the aid wherein there are two passages. Referring to FIG. 1 there is shown an isometric view of the aid 1 according to one embodiment.

DESCRIPTION AT THE PREFERRED EMBODIMENT

The aid 1 comprises a substantially planar body 2 which is either moulded in one piece or which is moulded in two halves. In the preferred embodiment the aid has a first planar member 37 overlying a second planar member 4. These members are spaced apart to form a passage 5 therebetween. In an alternative embodiment shown in FIG. 2 the aid comprises in addition to members 3 and 4 at least a third member 6 which is disposed between members 3 and 4 to form passages 7 and 8 between members 3 and 6 and 4 and 6 respectively. The additional passages are intended for accommodation of different sized coupons where necessary.

The planar members are interconnected at their ends by means of walls 9 and 10 which are either moulded integrally with the planar members or affixed to the planar members. The openings are adapted to receive in slidable engagement game coupons which are to be checked.

In use, when winning numbers are known by the player these are marked on the outer surface 11 of the uppermost member 3 in positions corresponding to the positions of those numbers on the grid pattern on the coupon. The coupon is fed into the passage until its printed grid aligns with a grid pattern on the surface 11 of member 3. When this alignment is made the player can then immediately make a visual determination whether the winning numbers erasibly marked on the planar member 3 correspond to the numbers which have been marked off on the game coupon.

It will be recognized by persons skilled in the art that numerous variations and modifications can be made to the invention as broadly described herein without departing from the overall spirit and scope of the invention.

What is claimed is:

1. A self aligning random number pattern visual checking aid for use with a game coupon said aid comprising:

a substantially planar base member and;

at least a first substantially planar member overlying the said planar base member but being spaced apart from said base member, to leave at least one opening between said base member and said overlying member or members, means interconnecting said planar members at or near their ends so as to form sidewalls of said opening or openings which act as aligning guides for a coupon inserted within said opening or openings, said overlying planar member or members having means to enable provision of erasable markings on the outer surface of said overlying member or members, wherein, when a marked coupon is to be checked, the coupon is manually fed into one of said opening or openings between said planar members until a grid pattern on said coupon aligns with grid markings on said outer surface.

2. A self aligning random number pattern visual checking aid according to claim 1 wherein the said opening or openings have a constant cross section along the length and breadth of said aid.

3. A self aligning random number pattern visual checking aid according to claim 1 wherein two planar members overly the base member so that two openings are formed, one between the planar base member and the first planar member and a second between the first planar member and a second planar member, said openings forming a through passage along which said coupon travels.

4. A self aligning random number pattern visual checking aid according to claim 2 wherein the said planar base member and planar member or members are made from transparent material.

5. A self aligning random number pattern visual checking aid according to claim 4 wherein the said planar members have return portions along two edges to form the said sidewalls said return portions engaging the planar base member or an adjacent planar member.

6. A self aligning random number pattern visual checking aid according to claim 5 wherein the overlying planar member or members are detachable from the planar base member.

7. A self aligning random number pattern visual checking aid according to claim 5 wherein the said opening or openings which form the said through passage are dimensioned as dimensioned so as to accommodate a coupon therein without said coupon deviating from the longitudinal axis of said passage when said coupon slides through said passage.

* * * * *